US006746627B2

United States Patent
Niu et al.

(10) Patent No.: US 6,746,627 B2
(45) Date of Patent: Jun. 8, 2004

(54) METHODS FOR PREPARING POLYVINYLIDENE FLUORIDE COMPOSITES

(75) Inventors: Chunming Niu, Lexington, MA (US); Lein Ngaw, Lowell, MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 09/988,973

(22) Filed: Nov. 20, 2001

(65) Prior Publication Data

US 2003/0111646 A1 Jun. 19, 2003

Related U.S. Application Data

(63) Continuation-in-part of application No. 09/903,189, filed on Jul. 11, 2001.

(51) Int. Cl.[7] .................................................. H01B 1/24
(52) U.S. Cl. ........................ 252/511; 264/105; 524/457; 524/496
(58) Field of Search .......................... 252/511; 264/105; 524/457, 496

(56) References Cited

U.S. PATENT DOCUMENTS

| 4,663,230 A | | 5/1987 | Tennent | |
|---|---|---|---|---|
| 5,591,382 A | * | 1/1997 | Nahass et al. | 252/511 |
| 5,643,502 A | | 7/1997 | Nahass et al. | |
| 5,651,922 A | * | 7/1997 | Nahass et al. | 252/511 |
| 5,705,120 A | * | 1/1998 | Ueno et al. | 264/483 |
| 6,090,459 A | * | 7/2000 | Jadamus et al. | 428/36.4 |

OTHER PUBLICATIONS

Feng, et al., "Carbon Black Filled Immiscible Blend of Poly (Vinylidene Fluoride) and High Density Polyethylene: Electrical Properties and Morphology," Conductive Polymers and Plastics In Industrial Applications, Larry Rupprecht, ed., Plastics Design Library 1999, pp. 43–49.

Babinec, et al., "Electroactive Thermoplastics," Advanced Materials, vol. 12, No. 23, Dec. 1, 2000, pp. 1823–1834.

* cited by examiner

*Primary Examiner*—Mark Kopec
(74) *Attorney, Agent, or Firm*—Barry Evans, Esq.; Kramer Levin Naftalis & Frankel LLP

(57) ABSTRACT

An electrically conductive composite comprising a polyvinylidene fluoride polymer or copolymer and carbon nanotubes is provided. Preferably, carbon nanotubes may be present in the range of about 0.5–20% by weight of the composite.

The composites are prepared by mixing or dispersing carbon nanotubes in polymer emulsion using an energy source such as a Waring blender. The liquid in the mixture is then evaporated to obtain the composite comprising the polymer and the nanotubes.

6 Claims, 4 Drawing Sheets

METHODS FOR PREPARING POLYVINYLIDENE FLUORIDE COMPOSITES

RELATED APPLICATIONS

This application is a continuation in part of U.S. Ser. No. 09/903,189, filed Jul. 11, 2001.

FIELD OF THE INVENTION

The invention relates generally to electrically conductive polyvinylidene fluoride composites containing carbon nanotubes, and the methods for preparing them.

BACKGROUND OF THE INVENTION

Polyvinylidene Fluoride

Plastics are synthetic polymers which have a wide range of properties that make them useful for a variety of applications ranging from packaging and building/construction to transportation; consumer and institutional products; furniture and furnishings; adhesives, inks and coatings and others. In general, plastics are valued for their toughness, durability, ease of fabrication into complex shapes and their electrical insulation qualities.

One such widely used plastic is polyvinylidene fluoride ($-H_2C=CF_2-$), ("PVDF"), which is the homopolymer of 1,1-difluoroethylene, and is available in molecular weights between 60,000 and 534,000. This structure, which contains alternating $-CH_2-$ and $-CF_2-$ groups along the polymer backbone, gives the PVDF material polarity that contributes to its unusual chemical and insulation properties.

PVDF is a semicrystalline engineered thermoplastic whose benefits include chemical and thermal stability along with melt processibility and selective solubility. PVDF offers low permeability to gases and liquids, low flame and smoke characteristics, abrasion resistance, weathering resistance, as well as resistance to creep and other beneficial characteristics. As a result of its attractive properties, PVDF is a common item of commerce and has a wide variety of applications (e.g., cable jacketing, insulation for wires and in chemical tanks and other equipments).

In addition to forming a homopolymer, PVDF also form co-polymers with other polymer and monomer families, most commonly with the co-monomers hexafluoropropylene (HFP), chlorotrifluoroethylene (CTFE), and tetrafluoroethylene (TFE), as well as terpolymers and olefins. The properties of the copolymers is strongly dependent on the type and fraction of the co-monomers as well as the method of polymerization. For example, HFP makes a homogenous copolymer with PVDF. On the other hand, the PVDF copolymer phase segregates if the other monomer is not fluorinated.

Conductive Plastics

Recently, demand and applications for electrically conductive plastics have grown. In these uses, one seeks to exploit the unique properties of plastics, often as an alternative to metals. For example, electrically conductive polymeric materials are desirable for many applications including the dissipation of electrostatic charge from electrical parts, electrostatic spray painting and the shielding of electrical components to prevent transmission of electromagnetic waves.

Conductivity (i.e., the ability of material to conduct or transmit heat or electricity) in plastics is typically measured in terms of bulk resistivity (i.e., volume resistivity). Bulk resistivity, which is the inverse of conductivity, is defined as the electrical resistance per unit length of a substance with uniform cross section as measured in ohm-cm. Thus, in this manner, the electrical conductivity of a substance is determined by measuring the electrical resistance of the substance.

Electrically conductive plastics can be divided into several categories according to their use. For example, high level of resistivity (i.e., low level of conductivity) ranging from approximately $10^4$ to $10^8$ ohm/cm generally confer protection against electrostatic discharge ("ESD") and is referred to as the ESD shielding level of conductivity. This is also the level of conductivity needed for electrostatic painting. The next level of resistivity, which ranges from approximately $10^4$ ohm/cm and lower, protects components contained within such plastic against electromagnetic interference ("EMI") as well as prevents the emission of interfering radiation, and is referred to as the EMI shielding level of conductivity. In order for a plastic article to be used as a conductive element like a current collector or separator plate in an electrochemical cell, resistivity less than $10^2$ ohm/cm is required.

The primary method of increasing the electrical conductivity of plastics have been to fill them with conductive additives such as metallic powders, metallic fibers, ionic conductive polymers, intrinsically conductive polymeric powder, e.g., polypyrrole, carbon fibers or carbon black. However, each of these approaches has some shortcomings. Metallic fiber and powder enhanced plastics have poor corrosion resistance and insufficient mechanical strength. Further, their density makes high weight loadings necessary. Thus, their use is frequently impractical.

When polyacrylonitrile ("PAN") or pitch-based carbon fiber is added to create conductive polymers, the high filler content necessary to achieve conductivity results in the deterioration of the characteristics specific to the original resin. If a final product with a complicated shape is formed by injection molding, uneven filler distribution and fiber orientation tends to occur due to the relatively large size of the fibers, which results in non-uniform electrical conductivity.

Principally because of these factors and cost, carbon black has become the additive of choice for many applications. The use of carbon black, however, also has a number of significant drawbacks. First, the quantities of carbon black needed to achieve electrical conductivity in the polymer or plastic are relatively high, i.e. 10–60%. These relatively high loadings lead to degradation in the mechanical properties of the polymers. Specifically, low temperature impact resistance (i.e., a measure of toughness) is often compromised, especially in thermoplastics. Barrier properties also suffer. Sloughing of carbon from the surface of the materials is often experienced. This is particularly undesirable in many electronic applications. Similarly, outgassing during heating may be observed. This adversely affects the surface finish. Even in the absence of outgassing, high loadings of carbon black may render the surface of conductive plastic parts unsuitable for automotive use.

Taken as a whole, these drawbacks limit carbon black filled conductive polymers to the low end of the conductivity spectrum. For EMI shielding or higher levels of conductivity, the designer generally resorts to metallic fillers with all their attendant shortcomings or to metal construction or even machined graphite.

What ultimately limits the amount of carbon black that can be put into plastic is the ability to form the part for which the plastic is desired for. Depending on the plastic, the carbon black, and the specific part for which the plastic is being made, it becomes impossible to form a plastic article with 20–60 wt % carbon black, even if the physical properties are not critical.

Carbon Fibrils

Carbon fibrils have been used in place of carbon black in a number of polymer applications. Carbon fibrils, referred to alternatively as nanotubes, whiskers, buckytubes, etc., are vermicular carbon deposits having diameters less than $1.0\mu$ and usually less than $0.2\mu$. They exist in a variety of forms and have been prepared through the catalytic decomposition of various carbon-containing gases at metal surfaces. Such fibers provide significant surface area when incorporated into a structure because of their size and shape. They can be made with high purity and uniformity.

It has been recognized that the addition of carbon fibrils to polymers in quantities less than that of carbon black can be used to produce conductive end products. For example, U.S. Pat. No. 5,445,327, hereby incorporated by reference, to Creehan disclosed a process for preparing composites by introducing matrix material, such as thermoplastic resins, and one or more fillers, such as carbon fibers or carbon fibrils, into a stirred ball mill. Additionally, U.S. Ser. No. 08/420,330, entitled "Fibril-Filled Elastomer Compositions," also incorporated by reference, disclosed composites comprising carbon fibrils and an elastomeric matrix, and methods of preparing such.

It has also been recognized that the addition of carbon fibrils to polymers can be used to enhance the tensile and flexural characteristics of end products. (See, e.g. Goto et al., U.S. application Ser. No. 511,780, filed Apr. 18, 1990, and hereby incorporated by reference.)

Additionally, prior work by Moy et al., U.S. application Ser. No. 855,122, filed Mar. 18, 1992, and Uehara et al., U.S. application Ser. No. 654,507, filed Feb. 23, 1991, both incorporated by reference, disclosed the production of fibril aggregates and their usage in creating conductive polymers. Moy et al. disclosed the production of a specific type of carbon fibril aggregate, i.e. combed yarn, and alluded to its use in composites. Uehara et al. also disclosed the use of fibril aggregates in polymeric materials. The fibril aggregates have a preferred diameter range of 100–250 microns. When these fibril aggregates are added to polymeric compositions and processed, conductivity is achieved.

U.S. Pat. No. 5,643,502 to Nahass et al., hereby incorporated by reference, disclosed that a polymeric composition comprising a polymeric binder and 0.25–50 weight % carbon fibrils had significantly increased IZOD notched impact strength (i.e., greater than about 2 ft-lbs./in) and decreased volume resistivity (i.e., less than about $1 \times 10^{11}$ ohm-cm). Nahass disclosed a long list of polymers (including polyvinylidene fluoride) into which carbon fibrils may be dispersed to form a composite. The polymers used by Nahass in the Examples of the '502 patent for preparing conductive, high toughness polymeric compositions include polyamide, polycarbonate, acrylonitrile-butadiene-styrene, poly (phenylene ether), and thermoplastic urethane resins and blends.

While the nanotube-containing polymer composites of the art are useful and have valuable strength and conductivity properties, many new uses for such composites require that very high strength and low conductivity be achieved with low nanotube loading in the polymer. Accordingly, the art has sought new composite compositions which achieve these ends.

OBJECTS OF THE INVENTION

It is a primary object of the invention to provide a polymer composite which is mechanically strong and electrically conductive.

It is a particular object of the invention to provide a polymer composite which has a higher level of conductivity than known polymer composites.

It is yet another object of the invention to provide polymer composites which achieve extraordinary levels of conductivity at low levels of nanotube loading.

It is a further object of the invention to provide methods for preparing a polymer composite which is mechanically strong and electrically conductive.

SUMMARY OF THE INVENTION

It has now been discovered that composites containing polyvinylidene fluoride polymer or copolymer and carbon nanotubes have extraordinary electrical conductivity. Composites with less than 1% by weight of carbon nanotubes have been found to have a bulk resistivity many times lower than the bulk resistivity of other polymer composites having similar nanotube loading. Composites with as little as 13% by weight carbon nanotubes have a bulk resistivity similar to that of pure carbon nanotube mats.

Composites containing polyvinylidene fluoride polymer or copolymer and carbon nanotubes may be prepared by dissolving the polymer in a solvent to form a polymer solution and then adding the carbon nanotubes into the solution. The solution is mixed using a sonicator or a Waring blender. A precipitating component is added to precipitate out a composite comprising the polymer and the nanotubes. The composite is isolated by filtering the solution and drying the composite.

Composites containing polyvinylidene fluoride polymer or copolymer and carbon nanotubes may also be prepared by adding carbon nanotubes to a polymer emulsion and then mixing the emulsion with a Waring Blender. The water/solvent is then removed by evaporation to obtain the composite comprising the polymer and the nanotubes.

DETAILED DESCRIPTION OF THE INVENTION

PVDF-Nanotube Composites

Figure 1:
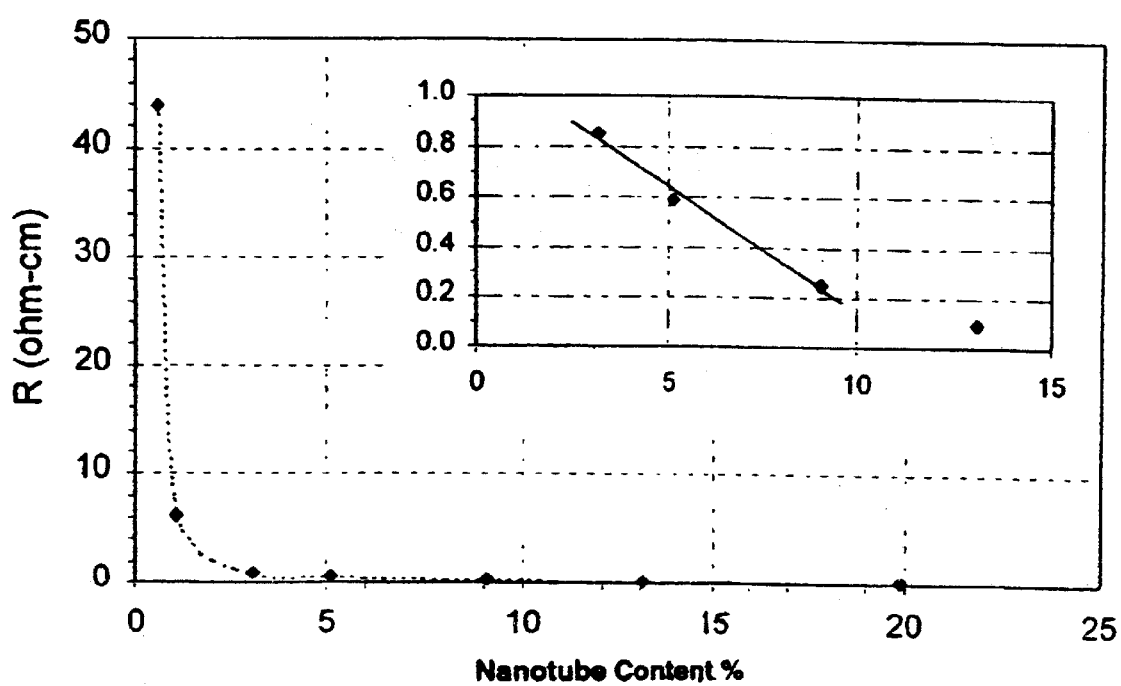
FIG. 1 is a graph plotting composite resistivity as a function of nanotube loading in a PVDF/HFP composite.

It has now been discovered that composites containing PVDF polymer or copolymer and carbon nanotubes have electrical conductivities much higher than other polymer/carbon nanotube composites known in the art. As used hereafter, the term "PVDF composite" refers broadly to any composite containing PVDF or a copolymer of vinylidene fluoride and another monomer, and carbon nanotubes. Unlike other polymer composites, PVDF composites with bulk resistivities as low as pure carbon nanotubes can be formed. For simplicity, the term percent nanotube loading (% nanotube loading) will be used to refer to percentage of nanotube by weight in the composite.

It has now been discovered that lower loadings of nanotubes in PVDF composites results in far higher conductivities than similar loadings in other polymer composites. For example, a PVDF composite with 5% nanotube loading has a bulk resistivity of 0.42 ohm-cm while a poly (paraphenylene sulfide) composite with 5% nanotube loading has a bulk resistivity of 3.12 ohm-cm.

PVDF composites containing carbon nanotubes in an amount as little as 1% or less by weight have an exceptionally low bulk resistivity compared to the pure PVDF polymer or copolymer, and have exceptionally low resistivity compared to other polymer composites at similar nanotube loadings. Nanotube loading may be widely varied. For example, PVDF composites may be made with nanotube loadings of broadly from 0.01–30% desirably from 0.5–20% and preferably from 1–15%. It has been found that PVDF composites have much lower bulk resistivities compared to other polymer composites at any given nanotube loading.

It has been further discovered that a PVDF composite with as little as about 13% nanotube loading has a bulk resistivity comparable to a pure nanotube mat, i.e., between 0.02 ohm-cm to 0.08 ohm-cm. PVDF composites with about 13% to 20% nanotube loading all have bulk resistivity values within the range of the resistivity values of a pure nanotube mat. PVDF composites can be formed with bulk resistivity of less than about 10 ohm-cm or less than about 1 ohm-cm. The bulk resistivity of PVDF composite may be adjusted by varying the nanotube loading to meet the level of conductivity required for its intended application.

Depending on how the composite is prepared, no further improvements in conductivity beyond 13–20% nanotube loading in PVDF were observed, the limiting resistivity of 0.02 ohm-cm (i.e., the resistivity of a pure mat of carbon nanotubes) having been reached. The lower limit of nanotube loading is set by the limit of percolation and will depend on various factors such as the method of composite formation, the materials used, etc. For example, Table 1 shows that the lower limit of nanotube loading under the conditions in Example 1 is well under 1%, but apparently above 0.2%.

The monomers which may be used with vinylidene fluoride monomer to form PVDF copolymers for the composites of the invention include hexafluoropropylene, polystyrene, polypropylene, CTFE, TFE, terpolymers or olefins. The copolymers may be produced broadly from a de minims amount of a monomer other than vinylidene fluoride to as much as 90% by weight of such monomer. Desirably copolymers of the invention contain from 1% to 70% by weight of such other monomer and preferably from 10% to 50% by weight thereof.

The PVDF composites of the invention also include mixtures of PVDF and other polymers, including those wherein the PVDF and other polymers are miscible or immiscible with one another. The PVDF composites of the invention also include mixtures of PVDF and copolymers formed from vinylidene fluoride and another monomer, as described above, and mixtures of these mixtures with other polymers.

Fillers such as graphite may also be used with PVDF copolymer composites.

Carbon Nanotubes

A variety of different carbon nanotubes may be combined with PVDF or PVDF copolymers to form the composites of the present invention. Preferably, the nanotubes used in the invention have a diameter less than 0.1 and preferably less than 0.05 micron.

U.S. Pat. No. 4,663,230 to Tennent, hereby incorporated by reference, describes carbon fibrils that are free of a continuous thermal carbon overcoat and have multiple ordered graphitic outer layers that are substantially parallel to the fibril axis. U.S. Pat. No. 5,171,560 to Tennent et al., hereby incorporated by reference, describes carbon nanotubes free of thermal overcoat and having graphitic layers substantially parallel to the fibril axes such that the projection of said layers on said fibril axes extends for a distance of at least two fibril diameters. As such, these Tennent fibrin may be characterized as having their c-axes, the axes which are perpendicular to the tangents of the curved layers of graphite, substantially perpendicular to their cylindrical axes. They generally have diameters no greater than $0.1\mu$ and length to diameter ratios of at least 5. Desirably they are substantially free of a continuous thermal carbon overcoat, i.e., pyrolytically deposited carbon resulting from thermal cracking of the gas feed used to prepare them. These fibrils are useful in the present invention. These Tennent inventions provided access to smaller diameter fibrils having an ordered outer region of catalytically grown multiple, substantially continuous layers of ordered carbon atoms having an outside diameter between about 3.5 to 70 nm, and a distinct inner core region, each of the layers and the core being disposed substantially concentrically about the cylindrical axis of the fibrils, said fibrils being substantially free of pyrolytically deposited thermal carbon. Fibrillar carbons of less perfect structure, but also without a pyrolytic carbon outer layer have also been grown.

Geus, U.S. Pat. No. 4,855,091, hereby incorporated by reference, provides a procedure for preparation of fishbone fibrils substantially free of a pyrolytic overcoat. When the projection of the graphitic layers on the nanotube axis extends for a distance of less than two nanotube diameters, the carbon planes of the graphitic nanotube, in cross section, take on a herring bone appearance. Hence, the term fishbone fibrils. These carbon nanotubes are also useful in the practice of the invention.

The "unbonded" precursor nanotubes may be in the form of discrete nanotubes, aggregates of nanotubes, or both.

Nanotubes aggregate in several stages or degrees. Catalytically grown nanotubes produced according to U.S. Ser. No. 08/856,657, filed May 15, 1997, hereby incorporated by reference, are formed in aggregates substantially all of which will pass through a 700 micron sieve. About 50% by weight of the aggregates pass through a 300 micron sieve. The size of as-made aggregates can, of course, be reduced by various means, but such disaggregation becomes increasingly difficult as the aggregates get smaller.

Nanotubes may also be prepared as aggregates having various morphologies (as determined by scanning electron microscopy) in which they are randomly entangled with each other to form entangled balls of nanotubes resembling bird nests ("BN"); or as aggregates consisting of bundles of straight to slightly bent or kinked carbon nanotubes having substantially the same relative orientation, and having the appearance of combed yarn ("CY") e.g., the longitudinal axis of each nanotube (despite individual bends or kinks) extends in the same direction as that of the surrounding nanotubes in the bundles; or, as aggregates consisting of straight to slightly bent or kinked nanotubes which are loosely entangled with each other to form an "open net" ("ON") structure. In open net structures, the extent of nanotube entanglement is greater than observed in the combed yarn aggregates (in which the individual nanotubes have substantially the same relative orientation) but less than that of bird nest. CY and ON aggregates are more readily dispersed than BN making them useful in composite fabrication where uniform properties throughout the structure are desired.

The morphology of the aggregate is controlled by the choice of catalyst support. Spherical supports grow nanotubes in all directions leading to the formation of bird nest aggregates. Combed yarn and open nest aggregates are prepared using supports having one or more readily cleavable planar surfaces, e.g., an iron or iron-containing metal catalyst particle deposited on a support material having one or more readily cleavable surfaces and a surface area of at least 1 square meters per gram. Moy et al., U.S. application Ser. No. 08/469,430 entitled "Improved Methods and Catalysts for the Manufacture of Carbon Fibrils", filed Jun. 6, 1995, hereby incorporated by reference, describes nanotubes prepared as aggregates having various morphologies.

Further details regarding the formation of carbon nanotube or nanofiber aggregates may be found in U.S. Pat. No. 5,165,909 to Tennent; U.S. Pat. No. 5,456,897 to Moy et al.; Snyder et al., U.S. patent application Ser. No. 149,573, filed Jan. 28, 1988, and PCT Application No. US89/00322, filed Jan. 28, 1989 ("Carbon Fibrils") WO 89/07163, and Moy et al., U.S. patent application Ser. No. 413,837 filed Sep. 28, 1989 and PCT Application No. US90/05498, filed Sep. 27, 1990 ("Fibril Aggregates and Method of Making Same") WO 91/05089, and U.S. application Ser. No. 08/479,864 to Mandeville et al., filed Jun. 7, 1995 and U.S. application Ser. No. 08/329,774 by Bening et al., filed Oct. 27, 1984 and U.S. application Ser. No. 08/284,917, filed Aug. 2, 1994 and U.S. application Ser. No. 07/320,564, filed Oct. 11, 1994 by Moy et al., all of which are incorporated by reference.

Other fibrils of different microscopic and macroscopic morphologies useful in the present invention include the multiwalled fibrils disclosed in U.S. Pat. Nos. 5,550,200, 5,578,543, 5,589,152, 5,650,370, 5,691,054, 5,707,916, 5,726,116, and 5,877,110 each of which are incorporated by reference.

Single walled fibrils may also be used in the composites of the invention. Single walled fibrils and methods for making them are described in U.S. Pat. No. 6,221,330 and WO 00/26138, both of which are hereby incorporated by reference. Single walled fibrils have characteristics similar to or better than the multi-walled fibrils described above, except that they only have a single graphitic outer layer, the layer being substantially parallel to the fibril axis.

PVDF composites containing carbon nanotubes with different grades, sizes, morphologies, or types have different bulk resistivity at a given fibrinl loading. For example, it has been found that combed candy ("CC") nanotubes provide lower bulk resistivity than bird nest ("BN") nanotubes in PVDF composites at low nanotube loading. Without wishing to be bound by any theory, it is believed that CC nanotubes, which are aggregated in parallel bundles, are easier to disperse in the polymer than BN nanotubes, resulting in a more even distribution of fibrils in the composite and hence, lower bulk resistivity.

The conductivity levels obtained using PVDF composites formed from PVDF polymer or copolymers and carbon nanotubes make it possible to use conductive plastic, with all its property and fabrication advantages, in place of metals or pure graphite in a number of applications.

Use of PVDF Composites

PVDF composites of the invention may be used in applications where exceptional electrical conductivity is important. Examples of such uses include current collectors for high power electrochemical capacitors and batteries. Current commercial materials used for these purposes have bulk resistivities of approximately 1 ohm-cm. Other applications include conducting gaskets or EMF shield coatings. In these applications, a difference of, for example, 0.04 ohm-cm in bulk resistivity will have a very significant impact on product performance.

Still further uses include bipolar plates for PEM fuel cells as well as bifunctional (binder and conductivity enhancers) additives to a lithium battery cathode. These bipolar plates are formed by preparing a PVDF composite as disclosed herein and then extruding a PVDF composite sheet with a thickness of, for example, 2 mm. A single screw extruder may be used for the sheet extrusion. Flow channels may be engraved between two hot plates, one with a mirror pattern of the front plate channel and the other with a mirror pattern of the back plate channel. The channels may run parallel to each other from one corner to another, with each channel separated from the other by 0.5 mm. The channels may have a width and depth of 0.5 mm.

Method of Preparing Composites

PVDF composites may be prepared by a solution method in which PVDF polymer or copolymer is dissolved in a solvent such as acetone to form a solution. Other soluble solvents such as tetrahydrofuran, methyl ethyl ketone, dimethyl formamide, dimethyl acetamide, tetramethyl urea, dimethyl sulfoxide, trimethyl phosphate, 2-pyrrolidone, butyrolacetone, isophorone, and carbitor acetate may be used.

Nanotubes are dispersed in the solvent by applying energy to the polymer-nanotube mixture. The energy source can be a mechanical homogenizer, ultrasonic sonifier, high speed mixer, Waring blender, or any other mixing means known in the art. A precipitating component such as water is added to precipitate or quench the solid composite containing the polymer and the nanotubes. The precipitating component may be any medium which is miscible with the solvent, but in which the PVDF polymer or copolymer mixture is insoluble.

The solvent may optionally be removed by filtration or evaporation and dried to isolate the PVDF composite. The composite may be isolated by drying or evaporating steps such as heat drying, vacuum drying, freeze-drying, etc. known in the art.

PVDF composites may also be prepared by a melt compounding process in which the PVDF polymer or copolymer is mixed with nanotubes in the mixing head of a mixer such as a Brabender mixture at high temperatures (i.e., over 200° C.) to melt and compound the PVDF polymer or copolymer into the carbon nanotubes to form the composite.

Once the composite has been obtained, it may then be molded as necessary using compression or injection molding equipment and methods known in the art.

PVDF composites prepared using the solvent solution method have significantly lower bulk resistivity and thus were better electrical conductors, than PVDF composites made using traditional melt compounding methods. Without wishing to be bound by any theory, it is believed that the solvent solution method allows for better intermixing of the PVDF with the carbon nanotubes in the PVDF composites, thus resulting in lower bulk resistivity.

It has also been found that at low nanotube loadings, using sonicators or ultrasonic sonifiers resulted in PVDF composites having lower bulk resistivities than PVDF composites made using mechanical mixing means such as Waring blenders. Without wishing to be bound by any theory, it is also believed that sonicators or ultrasonic sonifiers are able to better disperse low levels of nanotubes in the polymer than mechanical mixing means, resulting in better distribution of nanotubes within the composite and hence, better conductivity.

For any industrial processes where use of organic solvents is not preferred, PVDF composites may be prepared using PVDF emulsions. In this method, carbon nanotubes are directly mixed with or dispersed in PVDF emulsions (or PVDF latex, or any dispersions of PVDF in water) by applying an energy source such as a mechanical homogenizer, ultrasonic sonifier, high speed mixer, Waring blender, or any other mixing means known in the art. The water (or liquid) in the mixture is then removed, for example, by evaporation or any drying means known in the art to recover the PVDF composite.

EXAMPLES

Examples of electrically conductive PVDF composites and methods of preparing the same are set forth below.

Example I

A PVDF polymer, Kynar 761, was obtained from Elf Atochem and dissolved in acetone. Hyperion CC carbon nanotubes were added and dispersed into the polymer solution for two to five minutes using a high shear blender (i.e., Waring blender). Water was added to the dispersion to precipitate out the polymer with the nanotubes. The material was filtered and the filtrate was dried in a vacuum oven at 100° C. to remove acetone and water, leaving behind the dry nanotube/PVDF composite. Multiple sheets of the composite with thickness of 0.003–0.01 inches were made using a compression molder. Bulk resistivity of the thin sheet samples was measured using a four probe method. Tensile strength was also measured. Multiple batches with different amounts of carbon nanotubes were tested. The results are reported in Table 1 below:

TABLE 1

| Batch # | Nanotubes (g) | PVDF (g) | Nanotubes (%) | Thickness (inch) | Tensile Strength (psi) | Resistivity (Ohm-cm) |
|---|---|---|---|---|---|---|
| 1 | .02 | 10 | 0.20 | — | — | 300,000 |
| 2 | .09 | 10 | 0.89 | 0.0075 | 7005 | 73.7404 |
|   |     |    |      | 0.0107 | 7005 | 64.5745 |
|   |     |    |      | 0.0035 | 7005 | 88.5977 |
|   |     |    |      | 0.0109 | 7005 | 87.3533 |
| 3 | .11 | 10 | 1.09 | 0.0102 | 8145 | 22.5572 |
|   |     |    |      | 0.0058 | 8145 | 15.7831 |
| 4 | .31 | 10 | 3.01 | 0.0090 | 8072 | 1.2106 |
|   |     |    |      | 0.0099 | 8072 | 1.2189 |
|   |     |    |      | 0.0075 | 8072 | 1.3074 |
|   |     |    |      | 0.0067 | 8072 | 1.2219 |
| 5 | .53 | 10 | 5.03 | 0.0055 | 6739 | 0.3924 |
|   |     |    |      | 0.0080 | 6739 | 0.6255 |
|   |     |    |      | 0.0100 | 6739 | 0.4890 |
|   |     |    |      | 0.0050 | 6739 | 0.3912 |
| 6 | .61 | 8  | 7.08 | 0.0030 | 6770 | 0.2934 |
|   |     |    |      | 0.0040 | 6770 | 0.2992 |
|   |     |    |      | 0.0030 | 6770 | 0.2554 |
|   |     |    |      | 0.0098 | 6770 | 0.2819 |
| 7 | 1.5 | 15 | 9.09 | 0.0078 | 8025 | 0.2154 |
|   |     |    |      | 0.0100 | 8025 | 0.2359 |
|   |     |    |      | 0.0081 | 8025 | 0.2470 |
|   |     |    |      | 0.0090 | 8025 | 0.2175 |
| 8 | 1.24| 10 | 11.03| 0.0115 | 7144 | 0.1336 |
|   |     |    |      | 0.0132 | 7144 | 0.1177 |
|   |     |    |      | 0.0142 | 7144 | 0.1152 |
|   |     |    |      | 0.0130 | 7144 | 0.1496 |
| 9 | 1.2 | 8  | 13.04| 0.0115 | 7521 | 0.1012 |
|   |     |    |      | 0.0125 | 7521 | 0.0811 |
|   |     |    |      | 0.0108 | 7521 | 0.0938 |
|   |     |    |      | 0.0081 | 7521 | 0.0769 |
| 10| 1.5 | 6  | 20.00| 0.0120 | 5318 | 0.0387 |
|   |     |    |      | 0.0110 | 5318 | 0.0443 |
|   |     |    |      | 0.0065 | 5318 | 0.0441 |
|   |     |    |      | 0.0075 | 5318 | 0.0381 |
|   |     |    |      | 0.0130 | 5318 | 0.0419 |
| 11| 2   | 6  | 25.00| 0.0097 | 1918 | 0.0391 |
|   |     |    |      | 0.0090 | 1918 | 0.0371 |
|   |     |    |      | 0.0090 | 1918 | 0.0497 |
|   |     |    |      | 0.0120 | 1918 | 0.0483 |

The results of Example I show that a PVDF composite with less than 1% nanotube loading had a significantly lower bulk resistivity than a pure PVDF polymer. The bulk resistivity of the composites dropped significantly as the nanotube loading increased to approximately 3%. At approximately 5% nanotube loading, the bulk resistivity of the PVDF composite was below 1 ohm-cm. At approximately 13% nanotube loading, the bulk resistivity approached 0.08 ohm-cm, which is comparable to that of a pure CC nanotube mat. At nanotube loadings higher than 13% (i.e., 13–25%) the PVDF composite had bulk resistivities within the ranges of those of pure CC nanotube mats.

Example II

Using the procedure of Example I and Kynar 761 PVDF, a comparison was made of the resistivity of composites prepared with Hyperion CC nanotubes and with Hyperion BN nanotubes, respectively. The results are reported in Table 2 below:

TABLE 2

| | | CC Nanotubes | | BN Nanotubes | |
|---|---|---|---|---|---|
| Batch # | Nanotubes (%) | Resistivity (ohm-cm) | Tensile Strength (psi) | Resistivity (ohm-cm) | Tensile Strength (psi) |
| 1 | 1  | 19.17  | 8145 | 12987  | — |
| 2 | 5  | 0.4242 | 6739 | 4.1081 | 6663 |
| 3 | 7  | 0.2825 | 6770 | 1.6136 | 7227 |
| 4 | 11 | 0.1290 | 7144 | 0.4664 | 7201 |

The results of Example II confirm that at low nanotube loadings, PVDF/CC nanotube composites have significantly lower bulk resistivity than PVDF/BN nanotube composites.

Example III

Example I was repeated, except that an ultrasound sonicator or a homogenizer was used instead of a Waring blender to disperse the nanotubes in the polymer solution. The results are reported below in Table 3:

TABLE 3

| Batch # | Nanotubes (%) | Thickness (inch) | Dispersion Method | Resistivity (ohm-cm) |
|---|---|---|---|---|
| 1 | 1.05  | 0.0058 | Sonicator   | 11.7122 |
| 2 | 3.03  | 0.0080 | Sonicator   | 0.6144  |
| 3 | 13.04 | 0.0130 | Sonicator   | 0.0924  |
|   |       | 0.0110 | Sonicator   | 0.0959  |
| 4 | 13.04 | 0.0100 | Homogenizer | 0.1168  |
|   |       | 0.0110 | Homogenizer | 0.1028  |
| 5 | 20.00 | 0.0090 | Homogenizer | 0.0381  |
|   |       | 0.0090 | Homogenizer | 0.0509  |

These results revealed that PVDF composites with low carbon nanotube loadings made with a sonicator generally had lower bulk resistivities than composites which were made with a Waring blender. PVDF composites made with a homogenizer had similar bulk resistivity values to those made with a Waring blender.

Example IV

Example I was repeated, except that the nanotubes were heat treated under hydrogen, argon, or air before they were dispersed into the polymer solution. Heat treatment of the nanotubes was carried out by heating the nanotubes under a flowing gas at the following conditions: hydrogen—600° C. for 30 minutes; argon—1000° C. for 30 minutes. Air oxidation was carried out by heating the nanotubes in an oven in air at 450° C. for 2 hours. The results are reported below in Table 4:

TABLE 4

| | Original Nanotubes from Example1 | | H₂ Treated Nanotubes | | Ar Treated Nanotubes | | Air Oxidized Nanotubes | |
|---|---|---|---|---|---|---|---|---|
| Fibril % | R (ohm-cm) | Tensile Strength (psi) | R (ohm-cm) | Tensile Strength (psi) | R (ohm-cm) | Tensile Strength (psi) | R (ohm-cm) | Tensile Strength (psi) |
| 1.09 | 19.1701 | 8145 | 11.6651 | 7456 | 167.0608 | 7404 | 609.9 | 6995 |
| 5.03 | 0.4242 | 6739 | 0.4751 | 6578 | 0.7111 | 6648 | 2.6740 | 7474 |
| 20.00 | 0.0422 | 5318 | 0.0514 | 5456 | 0.0783 | 7855 | 0.1942 | 7051 |
| 25.00 | 0.0457 | 1919 | 0.0327 | 2721 | — | — | — | — |

Generally, heat treatment of nanotubes under hydrogen or argon did not improve the conductivity of the PVDF composites as compared to composites formed from nontreated nanotubes. PVDF composites formed from air oxidized nanotubes showed significantly poorer conductivity (i.e., higher bulk resistivity) but higher tensile strength (at 5–20% fibril loading) compared to composites formed from non-treated nanotubes.

Example V

Polyvinylidene fluoride-hexafluoropropylene (i.e., PVDF/HFP) copolymer was obtained from Solvay Advanced Polymers (21508) and the procedure of Example I was repeated with the PVDF/HFP copolymer instead of the pure PVDF Kynar 761 polymer. The results are reproduced in Table 5:

TABLE 5

| Batch # | Nanotubes (g) | PVDF/HFP (g) | Nanotubes (%) | Thickness (inch) | Voltage (v) | Current (amp) | Resistivity (ohm-cm) | Tensile Strength (psi) |
|---|---|---|---|---|---|---|---|---|
| 1 | 0.024 | 20 | 0.12 | | | | | |
| 2 | 0.12 | 20 | 0.60 | 0.0095 | 0.4250 | 0.001 | 46.4563 | 2793 |
| | | | | 0.0095 | 0.2750 | 0.001 | 30.0599 | |
| | | | | 0.0075 | 0.4150 | 0.001 | 35.8130 | |
| | | | | 0.0080 | 0.6000 | 0.001 | 55.2298 | |
| | | | | 0.0085 | 0.5200 | 0.001 | 50.8574 | |
| | | | | 0.0110 | 0.3500 | 0.001 | 44.2989 | |
| 3 | 0.22 | 20 | 1.09 | 0.0055 | 0.1025 | 0.001 | 6.4866 | 3296 |
| | | | | 0.0060 | 0.0700 | 0.001 | 4.8326 | |
| | | | | 0.0090 | 0.0700 | 0.001 | 7.2489 | |
| 4 | 0.64 | 20 | 3.10 | 0.0090 | 0.0075 | 0.001 | 0.7767 | 3343 |
| | | | | 0.0022 | 0.0380 | 0.001 | 0.9619 | |
| | | | | 0.0110 | 0.0065 | 0.001 | 0.8227 | |
| 5 | 1.08 | 20 | 5.12 | 0.0102 | 0.0048 | 0.001 | 0.5633 | 3206 |
| | | | | 0.0082 | 0.0052 | 0.001 | 0.4906 | |
| | | | | 0.0050 | 0.0110 | 0.001 | 0.6328 | |
| | | | | 0.0060 | 0.0095 | 0.001 | 0.6559 | |
| | | | | 0.0080 | 0.0067 | 0.001 | 0.6149 | |
| | | | | 0.0100 | 0.0055 | 0.001 | 0.6328 | |
| 6 | 2 | 20 | 9.09 | 0.0060 | 0.0036 | 0.001 | 0.2458 | 3695 |
| | | | | 0.0060 | 0.0034 | 0.001 | 0.2347 | |
| | | | | 0.0035 | 0.0072 | 0.001 | 0.2908 | |
| | | | | 0.0095 | 0.0024 | 0.001 | 0.2580 | |
| | | | | 0.0060 | 0.0035 | 0.001 | 0.2444 | |
| 7 | 3 | 20 | 13.04 | 0.0100 | 0.0012 | 0.001 | 0.1323 | |
| | | | | 0.0045 | 0.0017 | 0.001 | 0.0880 | |
| | | | | 0.0055 | 0.0022 | 0.001 | 0.1392 | |
| | | | | 0.0032 | 0.0025 | 0.001 | 0.0920 | |
| | | | | 0.0080 | 0.0014 | 0.001 | 0.1289 | |
| 8 | 1.52 | 10.1 | 13.08 | 0.0060 | 0.0015 | 0.001 | 0.1015 | 3165 |
| | | | | 0.0095 | 0.0008 | 0.001 | 0.0874 | |
| | | | | 0.0100 | 0.0009 | 0.001 | 0.1070 | |
| | | | | 0.0050 | 0.0021 | 0.001 | 0.1208 | |
| 9 | 1.54 | 10.04 | 13.30 | 0.0055 | 0.0154 | 0.010 | 0.0975 | |
| | | | | 0.0060 | 0.0124 | 0.010 | 0.0856 | |
| | | | | 0.0045 | 0.0186 | 0.010 | 0.0963 | |
| | | | | 0.0050 | 0.0125 | 0.010 | 0.0721 | |
| | | | | 0.0050 | 0.0187 | 0.010 | 0.1076 | |
| | | | | 0.0060 | 0.0125 | 0.010 | 0.0863 | |
| 10 | 1.95 | 10 | 16.32 | 0.0060 | 0.0012 | 0.001 | 0.0828 | |
| 11 | 2.54 | 10.18 | 19.97 | 0.0065 | 0.0177 | 0.010 | 0.1322 | |
| | | | | 0.0080 | 0.0120 | 0.010 | 0.1105 | |
| 12 | 2.6 | 10.04 | 20.57 | 0.0035 | 0.0026 | 0.001 | 0.1047 | |

The PVDF/HFP copolymer has lower crystallinity than PVDF polymer. The results of Example V showed that as little as 0.6% nanotube loading resulted in a bulk resistivity as low as 30 ohm-cm. The bulk resistivity of the PVDF/HFP composite continued to drop as the nanotube loading was increased to approximately 13%. The bulk resistivity dropped below 1 ohm-cm at 3.1% nanotube loading and the lowest reported bulk resistivity observed was 0.072 ohm-cm at 13.3% nanotube loading, which is within the range of bulk resistivity for a pure CC nanotube mat. However, no improvement in bulk resistivity was observed for PVDF/HFP composites with more than 13.3% nanotube loading. FIG. 1 illustrates the steepness of the drop in bulk resistivity up to 3% nanotube loading and then the rather linear decrease in bulk resistivity above 3% nanotube loading. An inset plot within the graph of FIG. 1 was provided to better display this linear decrease in resistivity between 3 and 13% nanotube loading.

PVDF/HFP composites with nanotube loadings up to approximately 3% appeared to have lower bulk resistivities than those of PVDF composites with the same nanotube loadings. Thus, at low nanotube loading, the conductivity of a PVDF composite may be improved by using a PVDF/HFP copolymer, or a lower grade PVDF with less crystallinity, instead of a pure PVDF polymer. However, it was also observed that the tensile strength of this PVDF/HFP composite is lower and thus the selection of the copolymer composite or the polymer composite will depend on the properties required in the final application.

Conversely, the bulk resistivity of the PVDF composite is lower than that of the PVDF/HFP composite at higher nanotube loading (i.e., ~20% or greater). It was further observed that PVDF/HFP composites with over 16% nanotube loading had rough surfaces and holes, and were difficult to mold since they broke easily.

Example VI

A different grade of PVDF/HFP copolymer (Kynar 2801) was obtained from Elf Atochem and the procedure of Example I was repeated. Kynar 2801 is also known as Kynar-Flex. The results are reproduced in Table 6:

Unlike the PVDF/HFP composite of Example V, the Kynar 2801 copolymer composite exhibited lower bulk resistivity above 13% nanotube loading. At 20% nanotube loading, the Kynar 2801 composite had bulk resistivity values of about 0.05 ohm-cm, which is within the range of a pure CC nanotube mat.

Example VII

PVDF composites were prepared by melt compounding PVDF (Kynar 761) and Hyperion CC nanotubes and/or graphite (Lonza KS-75) in the mixing head of a Brabender mixer at 100 RPM for approximately five minutes at the temperature specified. Each of the mixtures were prepared by sequential addition of the compounds in the following order: PVDF, nanotubes, then graphite, unless the mixtures were premixed as indicated by an asterisk (*). Once compounded, flat sheets were prepared by pressing small pieces of the composite between thin, chromed plates at approximately 240° C. with the thin plates being cooled to room temperature in one to two minutes. Resistivity was measured with a linear four probe head. The results are reported below in Table 7:

TABLE 7

| Batch # | PVDF (g) | Nanotubes (g) | Graphite (g) | Nanotubes (%) | Temp (° C.) | Resistivity (ohm-cm) |
|---|---|---|---|---|---|---|
| 1 | 40 | 10 | — | 20 | 210 | 0.148* |
| 2 | 42.5 | 7.5 | — | 15 | 215 | 0.171 |
| 3 | 51 | 9 | — | 15 | 230 | 0.117 |
|   |    |   |   |   | 245 | 0.126 |
| 4 | 49.5 | 10.5 | — | 17.5 | 240 | 0.105 |
| 5 | 48 | 12 | — | 20 | 245 | 0.092 |
| 6 | 51 | 9 | — | 12.5 | 250 | 0.156 |
| 7 | 58.2 | 1.8 | — | 3 | 240 | 12.1 |
|   |    |   |   |   |   | 1.93* |
| 8 | 45.5 | 9 | 14 | 13.1 | 240 | 0.064 |
| 9 | 44.8 | 8.2 | 9 | 13.2 | 240 | 0.075 |
| 10 | 60 | 10 | 5 | 13.3 | 240 | 0.109 |
| 11 | 58 | 10 | 7.5 | 13.2 | 240 | 0.091 |
| 12 | 56 | 10 | 10 | 13.1 | 240 | 0.077 |
|   |    |   |   |   |   | 0.055* |
| 13 | 52 | 10 | 12.5 | 13.4 | 240 | 0.068 |
| 14 | 63.9 | 0 | 11.4 | 0 | 240 | 1000* |
| 15 | 56 | 0 | 21.25 | 0 | 240 | 300* |

TABLE 6

| Batch # | Nanotubes (g) | Kynar-Flex (g) | Nanotubes (%) | Voltage (v) | Current (amps) | Thickness (inch) | Resistivity (ohm-cm) |
|---|---|---|---|---|---|---|---|
| 1 | 0.62 | 20 | 3.01% | 0.0128 | 0.001 | 0.0075 | 1.1046 |
|   |      |    |       | 0.0075 | 0.001 | 0.0105 | 0.9061 |
| 2 | 1.06 | 20 | 5.03% | 0.0093 | 0.001 | 0.0050 | 0.5350 |
|   |      |    |       | 0.0064 | 0.001 | 0.0075 | 0.5549 |
| 3 | 1.5 | 15 | 9.09% | 0.0035 | 0.001 | 0.0075 | 0.3020 |
|   |     |    |       | 0.0019 | 0.001 | 0.0104 | 0.2274 |
|   |     |    |       | 0.0021 | 0.001 | 0.0090 | 0.2175 |
|   |     |    |       | 0.0010 | 0.001 | 0.0200 | 0.2186 |
| 4 | 1.51 | 10 | 13.12% | 0.0105 | 0.010 | 0.0100 | 0.1208 |
|   |      |    |        | 0.0245 | 0.010 | 0.0040 | 0.1128 |
|   |      |    |        | 0.0115 | 0.010 | 0.0110 | 0.1456 |
| 5 | 1.54 | 10.14 | 13.18% | 0.0033 | 0.001 | 0.0040 | 0.1519 |
|   |      |       |        | 0.0025 | 0.001 | 0.0050 | 0.1438 |
|   |      |       |        | 0.0125 | 0.010 | 0.0100 | 0.1438 |
| 6 | 1.5 | 6 | 20.00% | 0.0006 | 0.001 | 0.0080 | 0.0506 |
|   |     |   |        | 0.0058 | 0.010 | 0.0078 | 0.0521 |
|   |     |   |        | 0.0004 | 0.001 | 0.0120 | 0.0525 |
|   |     |   |        | 0.0006 | 0.001 | 0.0080 | 0.0552 |

The results show that very conductive composites can be formed by melt compounding. Premixed materials appear to yield composites with lower bulk resistivity than composites formed by sequential addition.

Figure 2:
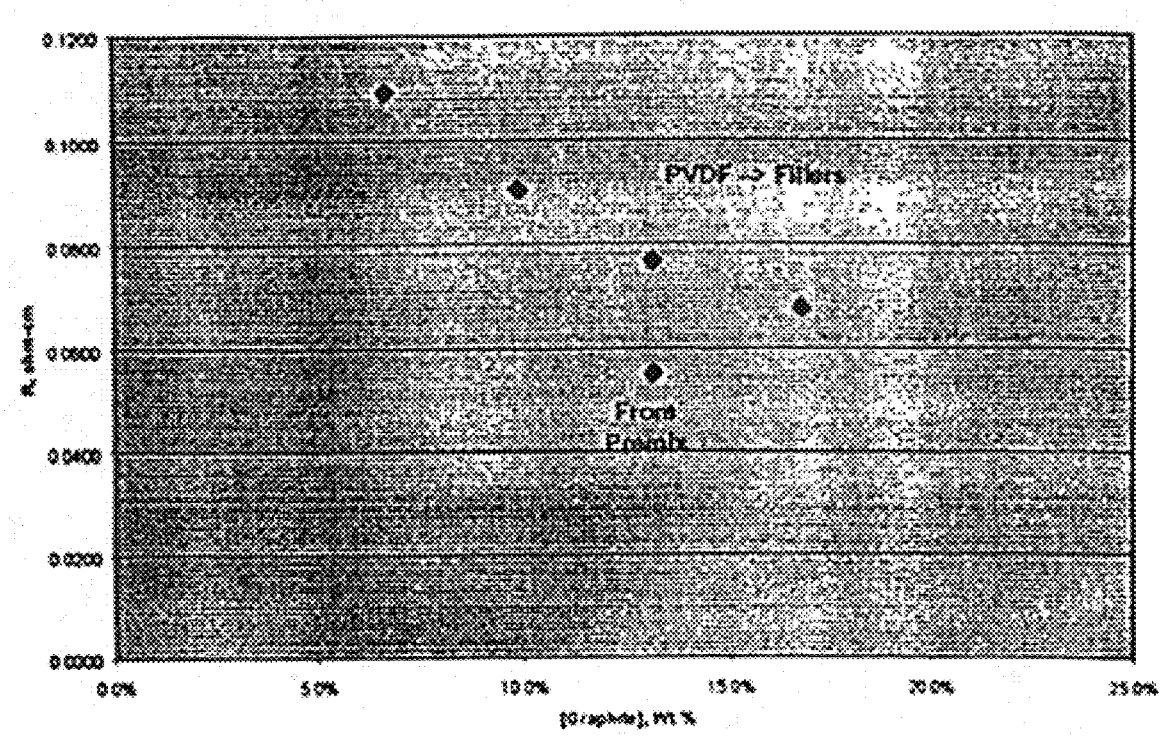
FIG. 2 is a graph plotting composite resistivity as a function of graphite concentration for PVDF composites with 13% nanotube loading.

As shown in Batches 8–12, it was discovered that increasing the graphite concentration in PVDF composites at a given nanotube loading increases the conductivity of the composite. FIG. 2, which plots the resistivity for Batch Nos. 8–12, illustrates the decrease in bulk resistivity as a function of the increase in graphite concentration in the PVDF composite with 13% nanotube loading.

Example VIII

Resistivity tests were performed on several polymer composites at several nanotube loadings. The composites were made using the solution procedure of Example I or the melt compounding procedure of Example VII. The following polymers were used:

PVDF-Sol (PVDF/nanotube composite made from solution);

Kynar-Flex (PVDF/HFP nanotube composite made from solution);

PVDF-Melt (PVDF/nanotube composite made by melt compounding);

PPS (poly(paraphenylene sulfide)/nanotube compound made by melt compounding);

EVA (poly(co-ethylene-vinyl acetate)/nanotube compound made by melt compounding);

PS (polystyrene/nanotube compound made by melt compounding); and

PE (polyethylene/nanotube compound made by melt compounding).

The results of Example VIII are shown below in Table 8:

TABLE 8

| Nanotube (weight fraction) | Nanotube (volume fraction) | Polymer | Resistivity (ohm-cm) |
|---|---|---|---|
| 0.02 | 0.01 | PPS | 19.00 |
| 0.03 | 0.03 | Kynar-Flex | 1.10 |
|  |  |  | 0.91 |
| 0.04 | 0.03 | PPS | 211.00 |
| 0.05 | 0.03 | PPS | 3.12 |
|  | 0.05 | Kynar-Flex | 0.55 |
|  |  |  | 0.54 |
|  | 0.05 | PVDF-Sol | 0.42 |
| 0.07 | 0.06 | PVDF-Sol | 0.28 |
|  | 0.05 | PPS | 1.97 |
| 0.09 | 0.08 | Kynar-Flex | 0.30 |
|  |  |  | 0.23 |
|  |  |  | 0.22 |
|  |  |  | 0.22 |
|  |  | PVDF-Sol | 0.23 |
| 0.11 | 0.10 | PVDF-Sol | 0.13 |
| 0.13 | 0.11 | PVDF-Melt | 0.16 |
|  | 0.12 | Kynar-Flex | 0.15 |
|  |  |  | 0.15 |
|  |  |  | 0.14 |
|  |  |  | 0.14 |
|  |  |  | 0.12 |
|  |  |  | 0.11 |
|  | 0.12 | PVDF-Sol | 0.09 |
| 0.15 | 0.11 | PPS | 0.25 |
|  |  |  | 0.25 |
|  | 0.14 | PVDF-Melt | 0.14 |
|  |  |  | 0.13 |
|  |  |  | 0.12 |

TABLE 8-continued

| Nanotube (weight fraction) | Nanotube (volume fraction) | Polymer | Resistivity (ohm-cm) |
|---|---|---|---|
|  | 0.18 | 0.16 | PVDF-Melt | 0.10 |
| 0.20 | 0.09 | EVA | 0.41 |
|  | 0.18 | PVDF-Melt | 0.09 |
|  | 0.18 | Kynar-Flex | 0.06 |
|  |  |  | 0.05 |
|  |  |  | 0.05 |
|  |  |  | 0.05 |
|  | 0.18 | PVDF-Sol | 0.04 |
|  | 0.09 | PE | 0.65 |
| 0.25 | 0.13 | PS | 0.20 |
|  | 0.23 | PVDF-Sol | 0.05 |
| 0.26 | 0.12 | PE | 0.34 |
|  | 0.12 | EVA | 0.24 |
| 0.27 | 0.15 | EVA | 0.25 |
|  | 0.13 | EVA | 0.23 |
|  | 0.14 | PS | 0.11 |
| 0.28 | 0.13 | PE | 0.29 |
| 0.29 | 0.14 | PE | 0.47 |
| 0.30 | 0.16 | PS | 0.15 |
|  | 0.14 | EVA | 0.13 |
| 0.33 | 0.16 | EVA | 0.20 |

The nanotube weight fraction was calculated by dividing the nanotube weight by the composite weight. The nanotube volume fraction was calculated by dividing the volume of the nanotubes by the volume of the composite. These volumes were calculated by dividing each of the nanotube and polymer weights by their respective densities (the volume of the composite is the sum of the nanotube and polymer volumes).

The results of Example VIII showed that the resistivities of the PVDF and PVDF/HFP composites are orders of magnitude lower than the resistivities of even the best conductive polymers at any given nanotube loading level. For example, at 5% nanotube loading, the PVDF and PVDF/HFP composites had bulk resistivity values ranging from 0.42 to 0.55 ohm-cm, while the bulk resistivity of the PPS composite was 3.12 ohm-cm. At 20% nanotube loading, The PVDF and PVDF/HFP composites had bulk resistivity values between 0.04–0.09 ohm-cm, which is within the range of a pure CC nanotube mat. No other polymer composite at 20% nanotube loading or at any higher nanotube loading level had a bulk resistivity value within the range of that of a pure CC nanotube mat. These differences are significant for applications where high electrical conductivity is crucial.

Figure 3:
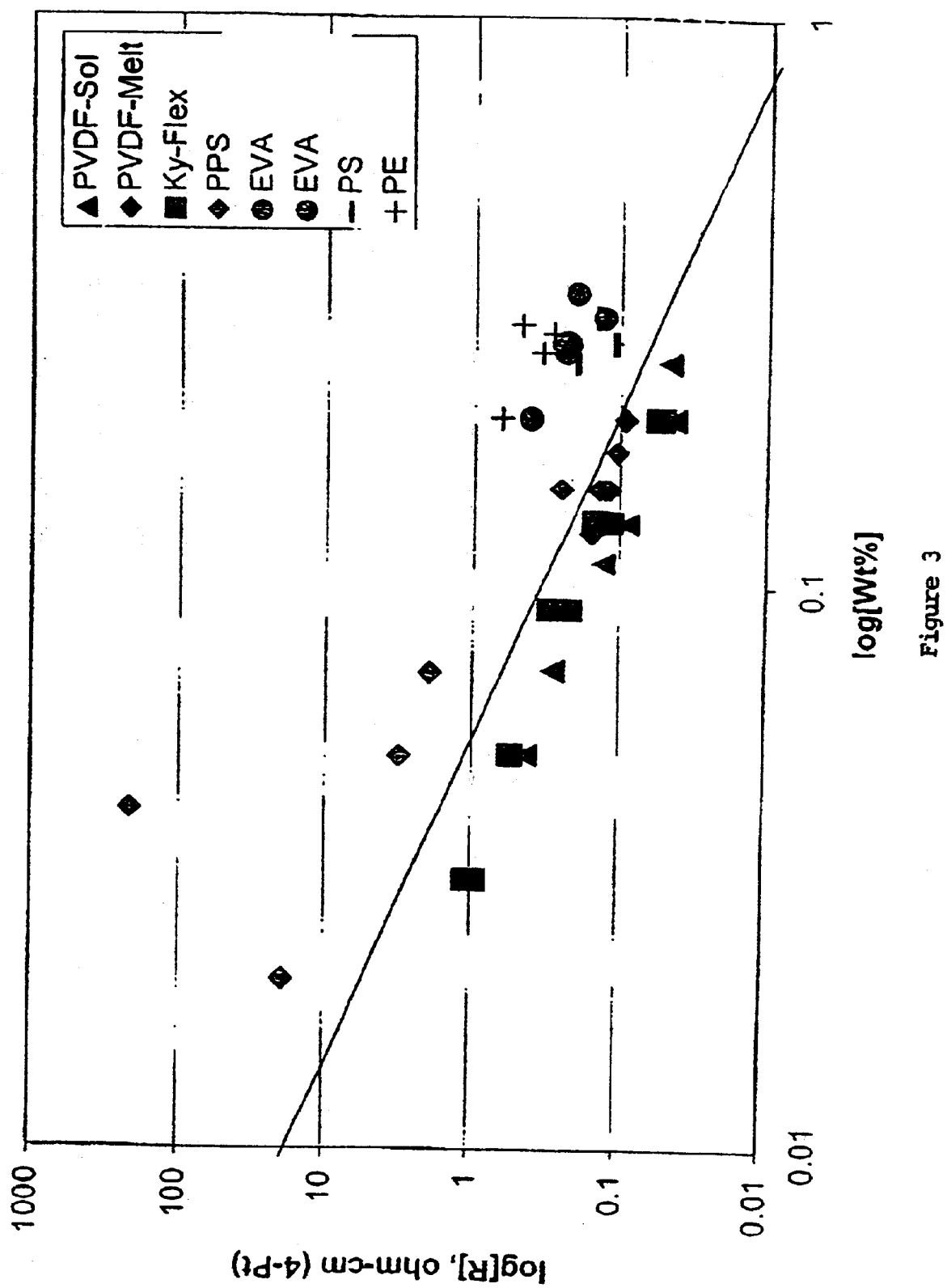
FIG. 3 is a logarithmic graph plotting resistivity as a function of nanotube weight fraction for various polymer composites.

FIG. 3 sets forth a logarithmic plot of nanotube weight vs. resistivity. A line is drawn which unequivocally distinguishes the resistivity of the PVDF composites from all other polymer composites, illustrating clearly that PVDF composites are superior to other polymer composites in electrical conductivity.

Figure 4:
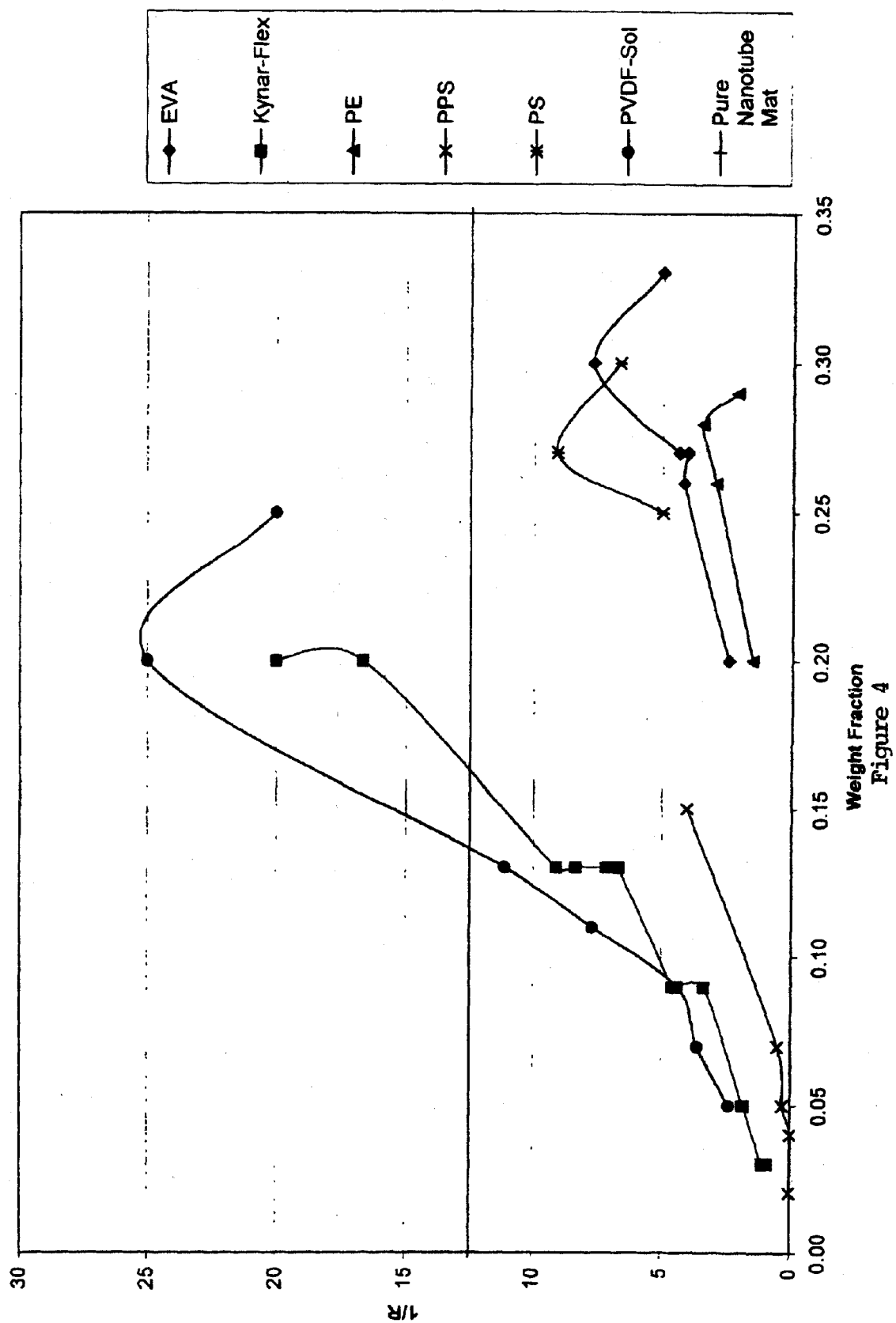
FIG. 4 is a graph plotting composite conductivity as a function of nanotube loading in various polymer composites.

FIG. 4 sets forth a plot of nanotube weight vs. conductivity. As FIG. 4 confirms, PVDF composites have clearly superior conductivity than other polymer composites known in the art. Additionally, FIG. 4 further shows that, unlike other polymer composites known in the art, conductivity for PVDF composites increase exponentially as the nanotube loading is increased to approximately 20%. PVDF composites also obtained the conductivity of a pure CC nanotube mat (i.e., 12.5–50/ohm-cm). Composites made from other polymers were unable to reach the conductivity range of a pure CC nanotube mat, even as the nanotube loading was increased beyond 30%.

Example IX

Multilayered structure comprising a first layer of a PVDF composite, a second layer of a thermoplastic or thermoplastic blend/composite, and an optional third adhesive layer between the first and second layers. The second layer can be a nylon-6 (6,6, 11, or 12), a nylon-clay composite known for excellent barrier and high heat distortion properties, or a nylon blend. The adhesive layer can be a PVDF-nylon blend with relatively lower viscosity. This layered structure can be fabricated in a sheet form, or into a container of any shape and size, or into a tubing/pipe. The inner layer for the container and tubing forms is preferably a PVDF composite layer. Since the PVDF polymer is known for its resistance to heat and hydrocarbons, and the nylon material, in particular, nylon-clay composite is known for its high heat distortion temperature, excellent barrier properties and good mechanical properties, containers and tubing formed from this multilayered structure can be used for safe storage and transport wide-range of hydrocarbons.

A multilayered tubing may be prepared using the following materials: PVDF composite of Kynar 761 and 13% loading nanotube, clay-nylon-6 composite and a PVDF (Kynar 741)-Nylon-6(30%) blend. The preparation of a three-layer tubing was carried out in a coextrusion system equipped with three extruders. The inner diameter of the tubing and thickness of each layer are: inner diameter: 20 mm; thickness of inner PVDF composite layer: 0.6 mm; thickness of adhesive PVDF-nylon blend layer: 0.2 mm; thickness of outer clay-nylon composite layer: 1 mm.

Example X

A PVDF emulsion, Kynar 720, was obtained from Elf Atochem. Hyperion CC carbon nanotubes were added and dispersed into the Kynar 720 emulsion using a high shear blender (i.e., Waring blender). The water/liquid sent in this mixture was removed by evaporation and thin specimens of the PVDF composition with dimensions of approximately 0.5'×3"×0.01' were prepared by hot press. The resistivities were measured and reported below:

| Nanotubes (%) | Resistivity (Ohm-cm) |
|---|---|
| 3 | 3.11 |
| 13 | 0.14 |
| 20 | 0.063 |

The results of Example X confirm that PVDF composites with low bulk resistivity may be prepared using PVDF emulsions. At 20% nanotube loading, the PVDF composite prepared using this method had a bulk resistivity within the range of a pure CC nanotube mat.

We claim:

1. A method for preparing an electrically conductive composite comprising the steps of:
    (a) mixing carbon nanotubes with a polymer emulsion, said emulsion comprising a liquid and a polymer selected from the group consisting of polyvinylidene fluoride and copolymer of vinylidene fluoride and another monomer; and
    (b) removing said liquid to form a composite comprising said nanotubes and said polymer, wherein said nanotubes have a diameter less than about 100 nanometers.

2. The method of claim 1, wherein the liquid is water.

3. The method of claim 1, wherein said removing step is performed by evaporating said liquid.

4. The method of claim 1, wherein said mixing step is performed with a high shear blender.

5. The method of claim 1, wherein said mixing step is performed with a Waring blender.

6. The method of claim 1, wherein said monomer is selected from the group consisting of hexafluoropropylene, polystyrene, polypropylene, chlorotrifluoroethylene, tetrafluoroethylene, terpolymers or olefins.

* * * * *